United States Patent
Harris et al.

(10) Patent No.: US 7,606,292 B1
(45) Date of Patent: Oct. 20, 2009

(54) SUB-SEQUENCE ACCUMULATION FILTER AND METHOD

(75) Inventors: Johnny M. Harris, Centerville, UT (US); Thomas R. Giallorenzi, Riverton, UT (US); Dan M. Griffin, Bountiful, UT (US); Eric K. Hall, Holliday, UT (US); Richard B. Ertel, Midvale, UT (US)

(73) Assignee: L-3 Communications Corporation, New York, NY (US)

( * ) Notice: Subject to any disclaimer, the term of this patent is extended or adjusted under 35 U.S.C. 154(b) by 994 days.

(21) Appl. No.: 11/136,782

(22) Filed: May 24, 2005

(51) Int. Cl.
*H04L 5/12* (2006.01)
(52) U.S. Cl. .............. 375/142; 375/152; 375/343; 370/320; 370/335; 370/342; 370/441; 708/422; 708/425
(58) Field of Classification Search ............ 375/142, 375/150, 152, 343; 370/320, 335, 342, 441; 708/200, 420, 422, 424–426
See application file for complete search history.

(56) References Cited

U.S. PATENT DOCUMENTS

| | | | | |
|---|---|---|---|---|
| 5,896,304 A | * | 4/1999 | Tiemann et al. | 708/5 |
| 6,049,576 A | * | 4/2000 | Magill | 375/365 |
| 7,042,930 B2 | * | 5/2006 | Dafesh | 375/149 |
| 7,233,969 B2 | * | 6/2007 | Rawlins et al. | 708/422 |
| 2003/0012270 A1 | * | 1/2003 | Zhou et al. | |

OTHER PUBLICATIONS

Yao, Y., et al., "A Two-Layer Spreading Code Scheme for Dual-Rate DS-CDMA Systems", IEEE Transactions on Communications, vol. 51, No. 6, Jun. 2003, p. 873-879.

* cited by examiner

*Primary Examiner*—Dac V Ha
(74) *Attorney, Agent, or Firm*—Harrington & Smith, PC (57) ABSTRACT

A parallel correlator and method includes temporarily storing in a series of P sequence registers, each of length $R_1$, serial bit-sequences of a code of length $N=P*R_1$. In a first-level of processing, certain unique bit sequences are inverted to reduce the number of unique bit sequences by half. Identical bit-sequences are then combined and temporarily stored in a first-level sub-accumulation register. Alternatively, bit sequences differing by only one bit may be combined in a common first-level sub-accumulation register. Further levels of similar processing may be imposed, where each subsequent level taps and inverts only a portion of the bits in the above level of processing, thereby reducing the number of unique bit sequences. Finally, all negative energy is combined in one register position, inverted, and added to all positive energy in the other register positions. When the spreading code was aligned among the series of sequence registers, the energy is added coherently and an energy peak is output, indicating alignment of the spreading code in the sequence registers.

19 Claims, 5 Drawing Sheets

SUB-SEQUENCE ACCUMULATION FILTER AND METHOD

CROSS-REFERENCE TO RELATED APPLICATIONS

This application is related to co-owned U.S. patent application Ser. Nos. 11/136,783; 11/136,943 (now U.S. Pat. No. 7,436,878); and 11/136,789, each of which is filed the same date as this application. Those related applications are hereby incorporated by reference.

FIELD OF THE INVENTION

The present invention relates to methods and apparatus for despreading codes used in spread spectrum communications, and is especially valuable for truly random spreading codes.

BACKGROUND

In digital spread spectrum (DSS) communication, a wide band carrier signal is modulated by a narrow band message signal. The wide-band carrier is typically generated by modulating a single frequency carrier using a pseudo-random noise (P/N) code sequence. The data rate at which a message is communicated is usually much lower than the P/N code symbol or "chip" rate. The ability of DSS to suppress interference is proportional to a ratio of the chip rate to data rate. In many applications, there are thousands of code chips per data bit.

At the receiver, a carrier replica is generated by reducing the DSS signal to baseband and multiplying it with a locally generated replica of the original narrow-band carrier using a local oscillator. If the frequency and phase of the carrier replica is the same as that of the received original narrow-band carrier, then the multiplier output signal will be the product of the bipolar P/N code and intended message. The P/N code is removed by multiplying the wide-band data stream with the locally generated replica of the P/N code that is time aligned with the received P/N code. This is the despreading process.

Generating the carrier replica with proper carrier frequency and phase and generating the P/N code replica at the proper rate and time offset is a complex problem. In many DSS communication systems, the necessary carrier frequency, carrier phase, and P/N code offset are not known a priori at the receiver, which tries different values until a large signal is observed at the data-filter output. This is termed the search or acquisition process, and a DSS signal is said to be acquired when the proper frequency, phase, and code offset have been determined. A receiver selects and detects a particular transmitted signal by choosing the appropriate P/N code and performing the acquisition search. In some cases the acquisition search must include examination of different P/N codes from a known list when the transmitting node is not known, as is the likely scenario in FIG. 1. When many different codes, code offsets and carrier frequencies must be examined and the SNR is low, the acquisition task can be both time and energy consuming.

The above constraints are more pronounced in a secure environment such as that depicted in FIG. 1 (detailed below), where a new node termed a hailing node 34 seeks to join an existing network while maintaining security for the joining node and those nodes already on the network. In addition, an established network requires a method of discovering the existence of another separate network that may have migrated into communication range, so that a cross-link can be established between the networks in order to form a larger network. This process of nodes "discovering" each other is termed herein node discovery, and is where DSS signal acquisition occurs. Typically, node discovery is done on channels separate from the primary data communication channels. Limited data exchange on the 'discovery channel' is preferable for network optimization. As a result, the discovery waveform must be flexible in the messages it carries and not be constrained to one specific message type or size.

The air interface should consist of a flexible and symmetric full-duplex or half-duplex link. The transmitting node or hailing node is that node that sends a discovery burst, essentially a message inquiring as to the presence of receiving nodes. Receiving nodes are the nodes that listen for that discovery burst. The receiving nodes are therefore target nodes, which may already have formed a network. These receiving nodes may become transmitting nodes when they send an acknowledgement back to the initiating new node. In this way, a new node that flies into range of an established network will transmit burst discovery messages on that transmitting node's transmit link. When a receiving node in the established network hears the discovery message on its receive link, it will respond via its transmit link which is the hailing node's receiving link. Subsequent handshaking can then be performed via the two node's transmit and receive links to bring the initiating new node into the network. The transmitting and receiving links may occupy separate time slots in a time division duplex (TDD) system, or may be separate frequency bands in a frequency division duplex (FDD) system.

Figure 1:
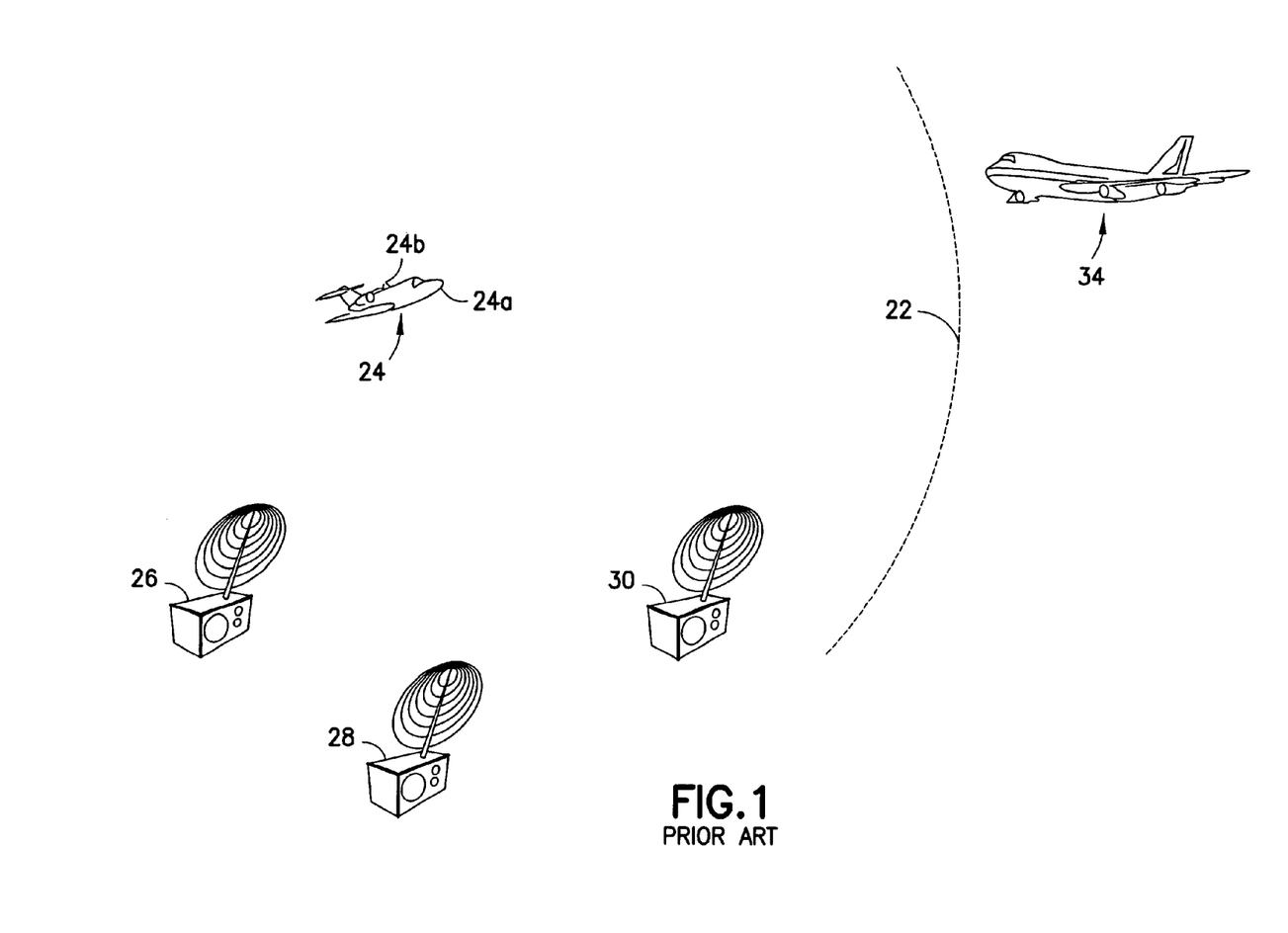
FIG. 1 is a schematic diagram of an environment in which the present invention may be advantageously employed, where several nodes operate in a secure communication network and an unknown node seeks entry into the network.

An exemplary but non-limiting environment in which node discovery may be important is illustrated in perspective view at FIG. 1, a prior art arrangement of disparate nodes operating in a traffic data network and one hailing node seeking to join the traffic network. The nodes may be airborne as in aircraft; terrestrial as in autos, trucks, and trains; or waterborne as in ships and other surface watercraft. They may be stationary or mobile, fast or slow moving, as for example, communications between nodes in a building, an aircraft, and an auto. For additional flexibility, it is assumed that a hailing node 34 may not have a clock signal synchronized with the network prior to joining. The range 22 of the traffic data network is centered on a command node 24, absent relays by other nodes within the network. Where the network links members via a satellite link, the line-of-sight range 22 is not particularly relevant. The range 22 is included to show further advantages of the invention that may be exploited when network communications are geographically limited.

The command node is representative of the node that receives the discovery burst, and may be a true command node that controls access to the secure network (in that no other nodes receive and acknowledge discovery bursts) or it may represent any node already established within the network that receives the discovery burst (such as where all established nodes listen for discovery bursts). In FIG. 1, all nodes depicted as within the traffic network range 22 communicate on the traffic network, either through the command node 24 or directly with one another once granted network entry. The traffic network typically operates by directional antennas 24a, at least at the command node 24, to maximize the network range 22. This is because directional antennas typically enable a higher antenna gain and a higher tolerable path loss as compared to omni-directional antennas. Therefore, a range (not shown) of a discovery network that operates using omni-directional antennas 24b is somewhat less, at least in the prior art. The command node 24 maintains communication with stationary nodes 26, 28. When two nodes are aircraft, they may be closing or separating from one another at very high rates, rendering Doppler effects significant. When a hailing node 34 sends a discovery burst to locate and request entry into the traffic network, its signal is typically not received at the command node 24 until the hailing node is within the traffic network range 22. Since the hailing node 34 is not yet identified as authorized, this potentially puts communications within the network at risk, or alternatively unduly delays granting the hailing node 34 access to the network. Because access to the traffic network is obtained through the discovery protocol, that protocol must exhibit security features to prevent compromise of the traffic network.

One way to increase security is to use a truly random spreading code, rather than a pseudo-random code as is known in the art. The problem with doing so lies in the receiver. Security is compromised if the receiver does not despread and answer a valid discovery burst within a short period of time (forcing the sender to transmit another discovery burst) and/or if the receiver relies on a training sequence that teaches how to despread the code itself. The present invention seeks to provide an apparatus and method for despreading a spread spectrum spreading code that may be used on a PN code or on a truly random code.

SUMMARY OF THE INVENTION

In accordance with one aspect, the present invention is a parallel correlator for determining a spreading code of length N. The parallel correlator has a plurality of P sequence registers each of length $R_1$ in series with one another. There is at least one first-level multiplier coupled to an output of each of the P sequence registers. Of the total number of the first level multipliers, a first portion of them each operate to invert an output of its associated sequence register and a second portion of them operate not to invert an output of its associated register. This effectively reduces the number of unique bit-sequences of length $R_1$ by half. The parallel correlator also has a plurality of first-level accumulators, each including an adder having an output coupled to a first-level register. The adders each operate to combine inputs from at least one multiplier of the first portion and one multiplier from the second portion, that is, at least one inverted and one non-inverted sequence. The first-level register is to temporarily store its respective logically combined input.

In another aspect, the present invention is a method for despreading a spread spectrum code. In the method, a received code of length N is temporarily stored in a series of P sequence registers, each such register being of length $R_1$, where $P*R_1=N$. Further in the method, a bit sequence that is stored in a subset of the sequence registers is inverted. After the inverting, at least a first set of bit-sequences that are identical are combined and stored in a first sub-sequence accumulation register, at least a second set of bit-sequences that are identical are combined and stored in a second sub-sequence accumulation register. In a preferred embodiment, only bit-sequences that are identical (after certain of those in the sequence registers are inverted by the multipliers) are combined in each of the first and second sub-sequence accumulation registers. In an alternative embodiment, bit-sequences that are identical (again, after inversion of some) are also combined with bit-sequences that differ from every other combined bit-sequence by no more than a single bit. The bit-sequences stored in the first and second sub-accumulation registers are combined in a total register. The series of N bits that are in the serial sequence registers are aligned with the original spreading code (or close to it where near-identical bit sequences are combined) when an energy peak is sensed at the total register or PNCA (PN correlation accumulator) register. The input signal is then multiplied by the series of N bits that are in the serial sequence registers. The spreading code that is despread according to this method may be truly random or pseudo random as in the prior art.

In another aspect, the present invention is a receiver that may be disposed on a mobile platform such as an aircraft, a terrestrial vehicle, a watercraft, or a space-based vehicle. The receiver has at least one receive antenna, a digital sampler having an input coupled to the at least one receive antenna, a multiplier having a first input coupled to an output of the digital sampler, a switch for selectively providing a second input to the multiplier, a PNCA accumulator for actuating the switch, and a parallel correlator. The parallel correlator of the receiver has a plurality of sequence registers each in series with one another, and a plurality of multipliers each coupled to an output of one of the sequence registers. A first portion of the multipliers providing an inverted output from their respective sequence register input, and a second portion of the multipliers provide a non-inverted output from their respective sequence register input. At least one correlator accumulator has inputs coupled to outputs of multipliers from the first and second portion, to combine at least all non-inverted multiplier outputs of the same kind or value with all inverted multiplier outputs of the same kind or value. That is to say, once inverted, the accumulator combines at least those output values from the various multipliers that are identical. The output of the correlator accumulator is coupled to an input of the PNCA accumulator, and an Output of the series of sequence registers is coupled to the second input of the multiplier.

These and other features, aspects, and advantages of embodiments of the present invention will become apparent with reference to the following description in conjunction with the accompanying drawings. It is to be understood, however, that the drawings are designed solely for the purposes of illustration and not as a definition of the limits of the invention.

BRIEF DESCRIPTION OF THE DRAWINGS

The present invention is described below more particularly with reference to the following drawing figures, which are not to scale except where stipulated.

DETAILED DESCRIPTION

Consider a truly random spreading code of length N=40 for ease of illustration, each member being positive or negative one. While the present invention is operable with pseudo-random codes also, its advantage over alternative parallel correlators is most pronounced with random spreading codes. For any sub-sequence of length four within the spreading code, there are a total of exactly sixteen possible values, as shown in Table 1 below.

TABLE 1

Sixteen Possible Values for any Sub-Sequence of Four Code Bits

| Column A | Column B |
|---|---|
| $A_1 = -1, -1, -1, -1$ | $B_1 = 1, 1, 1, 1$ |
| $A_2 = -1, -1, -1, 1$ | $B_2 = 1, 1, 1, -1$ |
| $A_3 = -1, -1, 1, -1$ | $B_3 = 1, 1, -1, 1$ |
| $A_4 = -1, -1, 1, 1$ | $B_4 = 1, 1, -1, -1$ |
| $A_5 = -1, 1, -1, -1$ | $B_5 = 1, -1, 1, 1$ |
| $A_6 = -1, 1, -1, 1$ | $B_6 = 1, -1, 1, -1$ |
| $A_7 = -1, 1, 1, -1$ | $B_7 = 1, -1, -1, 1$ |
| $A_8 = -1, 1, 1, 1$ | $B_8 = 1, -1, -1, -1$ |

The general concept of the present invention is to divide the N-length spreading code into smaller groups or sub-sequences of bits, and sum all similar sub-sequences together. Each sub-sequence of bits is preferably the same length (to avoid having to re-align outputs of different length registers in time), the length being an integer multiple of the total N number of bits in the total code. As applied to the above N=40 length code, assume the sub-sequences are each length four to yield the above sixteen unique four-bit sequences. Note that each of the unique four-bit sequences is an inverse of another unique four-bit sequence, apparent in Table 1 by inverse bit-sequence pairs being arranged horizontally adjacent to one another (sequence $A_1$ is the inverse of sequence $B_1$, sequence $A_2$ is the inverse of sequence $B_2$, etc.). Combining those inverse bit-sequence pairs into a single register allows for a substantial hardware reduction as compared to a very large correlator or an N-tap serial filter that would otherwise be necessary for a truly random spreading code of length N. Inverting one of the pairs prior to combining them enables coherent addition as is the preferred embodiment. Specific details are given below.

Figure 2A:
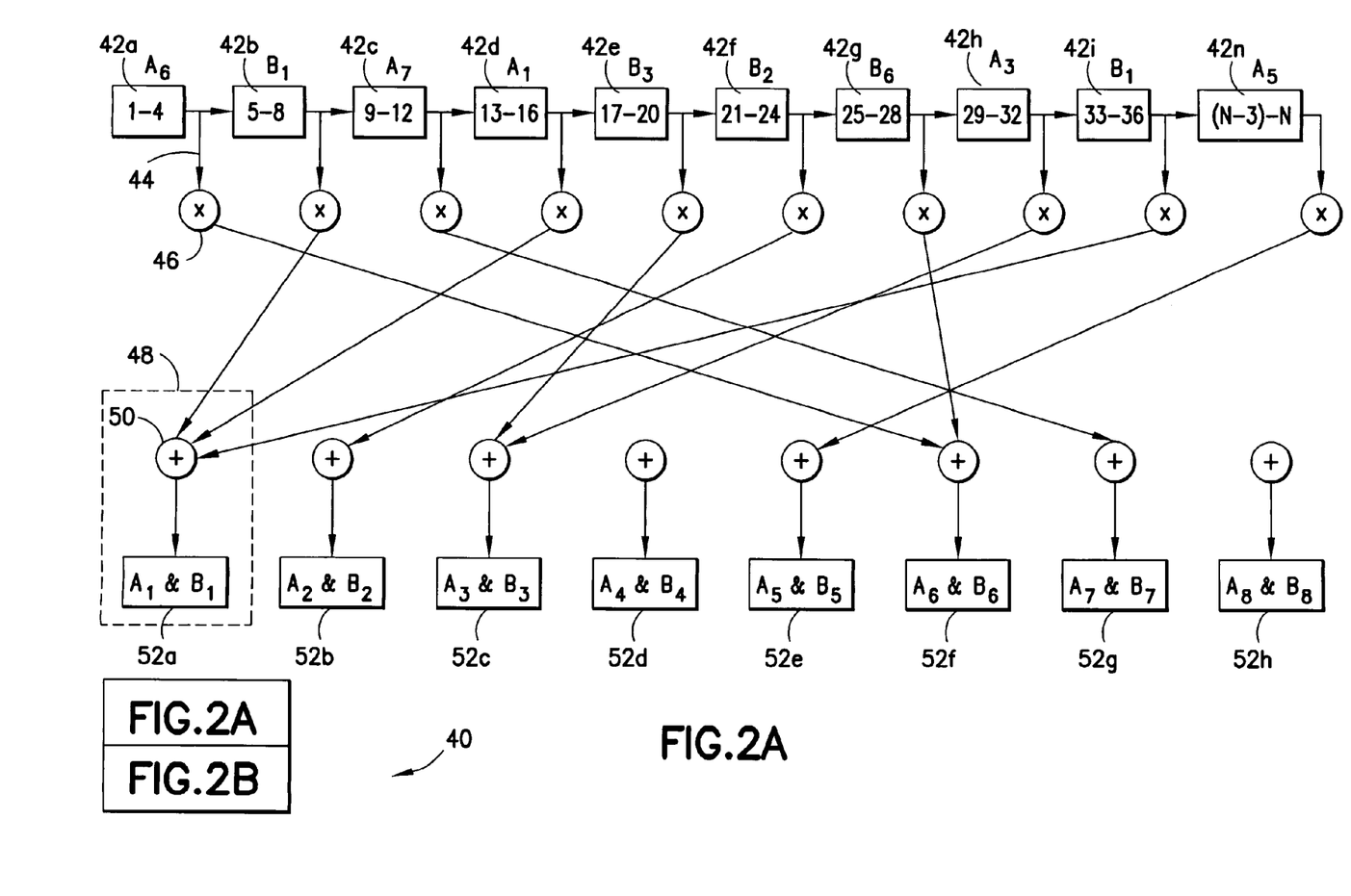
FIG. 2 is in two parts, 2A and 2B, a block diagram of a random spreading code parallel correlator according to the preferred embodiment of the present invention.
Figure 2B:
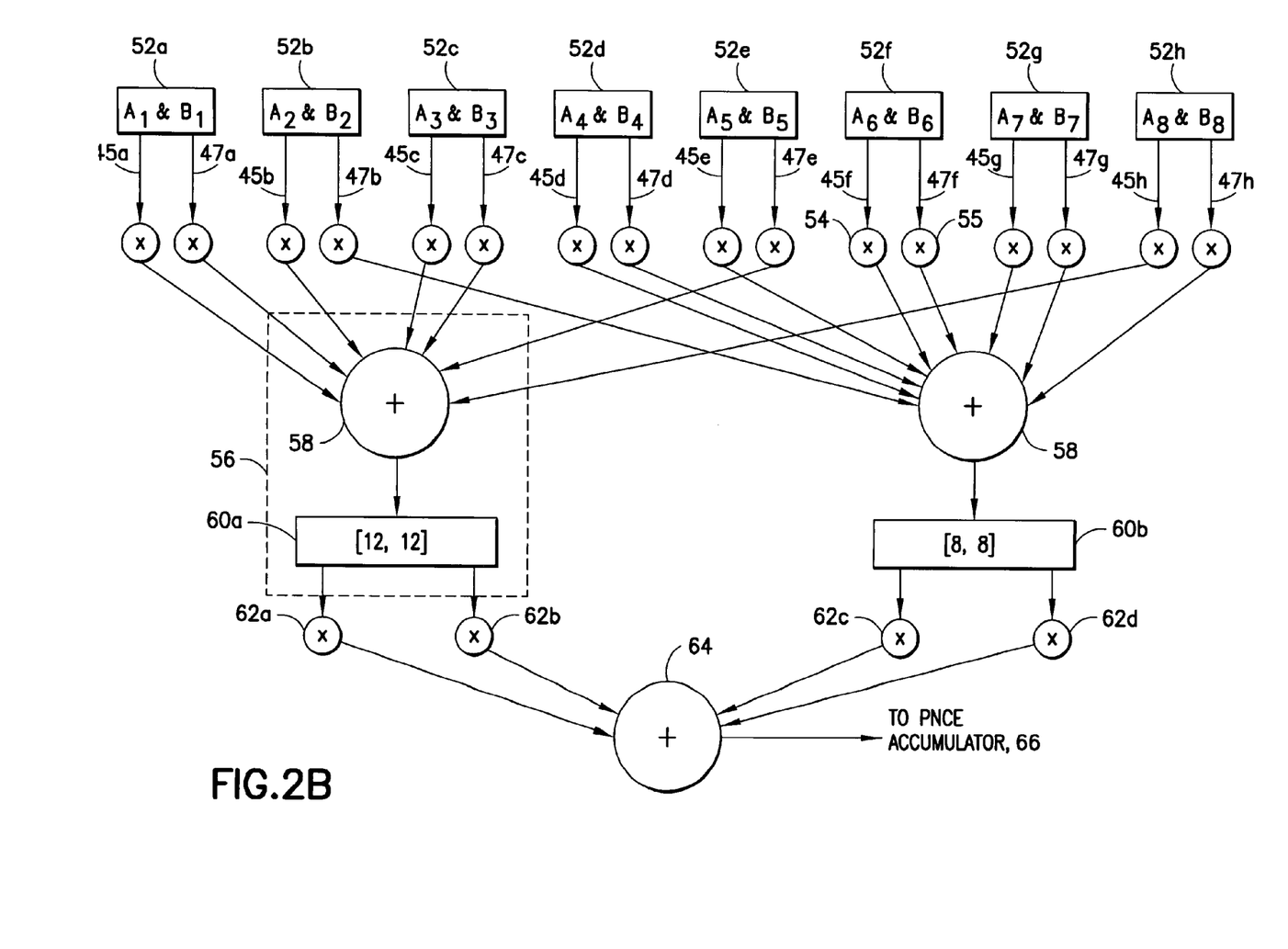

FIGS. 2A-2B are each portions of the preferred embodiment of a parallel correlator 40 of the present invention for any spreading code of arbitrary length N. The parallel correlator may be disposed within any CDMA or other spread spectrum receiver. For N=40 and the sub-sequences being four bits in length, a number P=10 of equal length sequence registers 42 in series each carry a number $R_1$=4 bits, where $R_1$ times P equals N, the total length of the spreading code. A tap 44 following each sequence register 42 feeds over four clock pulses the four-bit value that is temporarily in that sequence register to a first-level multiplier 46. At each clock pulse, one value in the sequence register 42 is tapped and multiplied by a multiplier value of either +1 or −1 (e.g., either not inverting or inverting the tapped bit). This effectively reduces the number of unique four-bit sequences from sixteen to eight. The multiplier value of +1 or −1, remains constant for any particular PN code, ensuring that only one alignment of the length 40 PN code along the entire series of P=10 sequence registers results in an energy peak at the resulting PNCA accumulator.

Assume the four-bit values in the sequence registers 42 are those values represented by the various identifiers $A_1$, $A_2$, $B_1$, $B_2$, etc. of Table 1 above. Matching subsequences, of which there are eight after the first-level multipliers 46, are input into one of eight first-level accumulators 48. In each first-level accumulator 48, the matched subsequent inputs are added at a first-level adder 50 and input into a first-level register 52, which is of the same $R_1$ length as the sequence registers 42. For the example of FIGS. 2A-2B, each of the first-level multipliers 46 that operate on a four-bit value from column A of Table 1 multiply by −1, and multiply by +1 for all four-bit values from column B of Table 1.

An example is enlightening. Consider the first level register 52$f$, which takes as inputs the sequence registers 42$a$ (containing the bit sequence $A_6$ when the PN code is aligned among all the sequence registers 42) and 42$g$ (containing the sequence $B_6$ when the PN code is so aligned). While only two sequence registers, 42$a$ and 42$f$, are shown as being coupled to the subject first level register 52$f$, it is understood that for a PN code of more typical lengths (e.g., on the order of $10^3$ or $10^4$), it is likely that many more than two sequence registers will typically input into a single first level register 52. Applying the values from Table 1, the bit sequence for $A_6$ is [−1, 1, −1, 1] and the bit sequence for $B_6$ is [1, −1, 1, −1], inverse bit sequences of one another. Assume the multiplier value of the multiplier 46 associated with the sequence register 42$a$ is −1, and the multiplier value of the multiplier 46 associated with the sequence register 42$f$ is +1. At a first clock pulse, the relevant tap 44 operates on the rightmost bit of the respective bit sequence present in the sequence register 42, yielding −1 from each multiplier 46 (the respective relevant bit sequences being $A_6$ and $B_6$ of Table 1 when the PN code is aligned). These values are summed at the respective adder 50 and input into the first level register 52$f$ as −2. At a second clock pulse, the entire series of bits in the series of sequence registers 42 shifts one bit to the right. Considering again only the sequence registers 42$a$ and 42$f$, the next tapped bit (second from the right as reproduced in Table 1 for sequences $A_6$ and $B_6$) is tapped and multiplied, each multiplier 46 now yielding a +1. These are combined at the adder 50 and input into the relevant first level register 52$f$ as +2. The original −2 value is shifted one digit to the right in that first level register 52$f$, so the set is [2, −2, x, y], where x and y represent bits previously entered (when the PN code was not aligned in the sequence registers 42) and not specifically described. The third and fourth clock pulses operate on the relevant rightward-moving digits of $A_6$ and $B_6$ (Table 1) to yield −1 and +1 from each respective multiplier 46. After four clock pulses, the x and y bits have been shifted out of the first level register 52$f$, and the sequence now within that first level register 52$f$ is [2, −2, 2, −2]. The multiplier value for the multiplier associated with the sequence register labeled $A_6$ is opposite that for the sequence register labeled $B_6$, and remains constant for a particular PN code. Because this holds true for each sequence register 42 when the entire PN code is aligned among the series of sequence registers 42, the effective number of unique bit sequences of length $R_1$ is reduced by half, and the bit sequences that are inversions of one another are coherently added and input into one first level register 52.

At this point, the value of the sum of all eight first-level registers 52, multiplied by the proper code (as present in the sequence registers 42 at the moment those sequence register values yielded the values of the first-level registers 52), is equivalent to the despread value of the original sequence. The remaining thirty-two values, four bits in each of eight first-level registers 52, can be despread by a conventional parallel correlator or by another level of similar processing as particularly shown in FIG. 2B. Following the above description, the sequences in the first level registers as illustrated in FIG. 2A, where the bit sequences of column B in Table 1 are tapped and multiplied by a +1 and those of column A are tapped and multiplied by −1, are as follows:

TABLE 2

Representative values of the first level registers 52.

| First Level Register | Set |
| --- | --- |
| 52a | [3, 3, 3, 3] |
| 52b | [1, 1, 1, −1] |
| 52c | [2, 2, −2, −2] |
| 52d | No inputs illustrated |
| 52e | [1, −1, 1, 1] |
| 52f | [2, −2, 2, −2] |
| 52g | [1, −1, −1, 1] |
| 52h | No inputs illustrated |

FIG. 2B repeats the first-level registers 52 of FIG. 2A for clarity of illustration, it being understood that in the combined parallel correlator 40 represented by FIGS. 2A-2B, there is only one row of first-level registers 52. As in the example detailed above, each of the first-level registers 52 are of length $R_1$=4 bits. Where the apparatus of FIG. 2A may be considered a first sub-accumulation, the apparatus of FIG. 2B may be considered a second sub-accumulation. Each of the first-level registers 52 have a first tap 45 and a second tap 47. When the entire PN code is aligned, each of the first and second taps 45, 47 operate (once per clock pulse) on the leftmost and rightmost pair of bit values, respectively, within its relevant first-level register 52. As in FIG. 2A, tap 45, 47 feeds into a first or second multiplier 54, 55, of the second level that multiplies by +1 or −1 (either not inverting or inverting the values input thereto). In this second level sub-accumulation, the object is to accumulate all of the positive values and all of the negative values separately. It is also convenient at this juncture to invert all negative energy. Two separate second level accumulators operate to accumulate values according to different signs of value pairs. The concept is to coherently accumulate energy (accumulate positive energy with inverted negative energy to accumulate all energy constructively). The multiplier values are selected so that, when the PN code is aligned, positive energy is added to positive and negative energy is added to negative. The end result is that, for the two separate two-digit registers 60 (60a and 60b) of the second level sub-accumulators 56, each digit carries only coherently accumulated positive energy. Alternatively, negative energy may be coherently accumulated in specified digits and separately inverted following accumulation in the two-bit registers 60a, 60b. To achieve all positive energy in the second level accumulators 60a, 60b, all value pairs in the first level registers 52 with like signs (positive or negative) are multiplied by either +1 or −1 to achieve only positive energy, which is added at one second level adder 58 and entered into one of the second level registers 60a, 60b. For the example of the first level register 52f with contents [2, −2, 2, −2], a non-inverting first-level multiplier 54 [+1] operates on the first and third bits, and another inverting first-level multiplier 55 [−1] operates on the second and fourth bits. At the same clock pulse, the non-inverting multiplier 54 outputs [2] from the third bit of the first-level register 52f, and the inverting multiplier 55 outputs [2] by inverting the fourth bit of the first-level register 52f. These pass into the second level register 60b, and are accumulated with outputs from other first-level registers 52. Upon the next clock pulse, those previous values area moved to the rightmost digit of the second level accumulator 60b. Input into the left-most digit is the result of the non-inverting first-level multiplier 54 operating on what was stated above as the first bit [2] of the first level register 52f and the result of the inverting first-level multiplier 55 operating on what was stated above as the second bit [−2] of the first level register 52f. Each of these outputs at the next clock pulse are [2].

FIG. 2B is described with reference to the values of Table 2 above, with the exception that the values within register 52d is [−3, 3, 3, −3] and within register 52h is [−2, −2, −2, 2], selected arbitrarily to complete the contents of the registers. The values of each first level register 52 are then as listed in the following table, divided by tap, and the appropriate multiplier value is shown:

TABLE 3

Representative Second Level Multipliers and Inputs to Adders

| Register | Value Pair | Tap | Multiplier value | Output to Adder |
| --- | --- | --- | --- | --- |
| 52a | 3, 3 | 45a | +1 | 3, 3 |
|  | 3, 3 | 47a | +1 | 3, 3 |
| 52b | 1, 1 | 45b | +1 | 1, 1 |
|  | 1, −1 | 47b | +1 | 1, −1 |
| 52c | 2, 2 | 45c | +1 | 2, 2 |
|  | −2, −2 | 47c | −1 | 2, 2 |
| 52d | −3, 3 | 45d | −1 | 3, −3 |
|  | 3, −3 | 47d | +1 | 3, −3 |
| 52e | 1, −1 | 45e | +1 | 1, −1 |
|  | 1, 1 | 47e | +1 | 1, 1 |
| 52f | 2, −2 | 45f | +1 | 2, −2 |
|  | 2, −2 | 47f | +1 | 2, −2 |
| 52g | 1, −1 | 45g | +1 | 1, −1 |
|  | −1, 1 | 47g | −1 | 1, −1 |
| 52h | −2, −2 | 45h | −1 | 2, 2 |
|  | −2, 2 | 47h | −1 | 2, −2 |

For each of the value pairs in the first level registers 52, Table 3 shows that only those having the respective signs (−, +) are inverted by the respective multiplier 54. The multiplier values are selected such that all negative values output from the multipliers occupy the same bit position. This allows coherent accumulation of all energy as follows. All multiplier outputs that are positive in value over both positions (both clock pulses) are input into one of the second level adders 58 and kept in an associated second level register 60a. All remaining multiplier outputs are necessarily of the (+, −) variety, and when added over two clock pulses and input into the remaining second level register 60b, that register 60b carries a corresponding pair of values with sign (+, +) when the appropriate first-level multiplier 55 inverts. Specifically, using the values of Table 3 applied to FIG. 2B, the second level register 60 at the left of FIG. 2B will carry the values [12, 12] from the outputs over two clock pulses from taps 45a, 47a, 45b, 45c, 47c, 47e, and 45h. The remaining second level register at the right of FIG. 2B will carry the values [8, 8] from the remaining taps. It is noted that no energy is lost to this point (in theory) because all addition is coherent; no energy has been combined in a manner by which negative bit energy would cancel positive bit energy.

As above, the remaining four values, two bits in each of two second-level registers 60, can be despread by another level of similar processing, as is also shown in FIG. 2B. However, it is straightforward to complete the process in accordance with these teachings rather than to append a traditional correlator at this point. Each of the second-level registers 60 carries two bits. In the event that negative energy was not inverted prior to being input into the second level registers 60a, 60b, and negative energy was instead accumulated in one or more digits there, it may be inverted by a separate third-level multiplier 62 that multiplies by −1 as shown in FIG. 2B as an alternative. These additional second level multipliers 62a-d are unnecessary where negative energy is inverted upon being tapped from the first-level registers 52, as only positive energy then resides in the second level registers 60a, 60b. In the example above, the resulting outputs from the second level registers 60a, 60b (whether negative energy is inverted or only positive energy is entered into them) to a third level or final adder 64 are then [12], [12], [8], and [8]. This accumulated value is output to a PNCA accumulator 66. Neglecting the few clock pulse delay in passing the energy from the sequence registers 52 to the PNCA accumulator 66, an energy peak occurs where the overall PN code is aligned with the series of sequence registers. In the example, the energy peak is 40, because that is the processing gain for the PNCA code. The code moves along those registers 52 with each clock pulse, and when not aligned, addition throughout the apparatus is not coherent because selection of the particular multiplier values are predicated on alignment. Once aligned, an energy peak occurs and the receiver knows that alignment occurred.

It will be recognized that the above description is idealized, and that errors may occur in transmission or sampling so that the true PNCA value will be somewhat less than N. However, because noise is assumed Gaussian and randomly distributed, it follows that interference and other errors that affect negative energy bits will be generally offset by a similar effect on positive energy bits, and the energy peak will remain though somewhat less than idealized. Further, whereas the above description concerned real-valued spreading codes, the concept and apparatus operate equally well with complex spreading codes as well.

The preferred embodiment described above is not limited in the length of the sequence registers 42 or the first and second-level registers 52, 60. For example, using sequence registers 42 of length $R_1=8$ yields 256 unique eight-bit sequences, which is reduced to 128 unique sequences by selectively multiplying half of them similar to that described above. There will then be 128 first-level registers 52, each of length $R_1=8$. Within a second sub-accumulation fed by those first-level registers 52 might be a plurality of registers having a length less than $R_1$, the exact number depending upon the second-level register length. Assume the second-level registers 60 in this embodiment are of length $R_2=2$ bits (yielding a total of eight second-level registers), where four taps 44 each input a distinct pair of bits from the first-level registers 52 to their associated second-level multipliers 54. That leaves a third-level adder 64 having inputs from sixteen taps, two from each of the eight second-level registers 60. Other embodiments with different length registers 42, 52, 60 are readily constructed in accordance with these teachings. Further, a parallel correlator may also be constructed using only the first level accumulators 52 and a number of taps and multipliers associated with each that equals the number of bits in those first level registers 52. These multipliers then each provide an input into the final adder 64 and PNCA accumulator 66. This embodiment is seen to eliminate some hardware but may create a speed barrier for very long PN codes considering the multiplicity of adds within the final adder 64.

In the above preferred embodiment that begins with four-bit sequence registers 42, there are a total of 25,020 multiplies (25,000 sequence register taps and multiplies, 8*2=16 first-level taps and multiplies, and 4 second-level taps and multiplies) to resolve the random code of length N=100,000. In the above embodiment that begins with eight-bit sequence registers 42, there are a total of 13,028 multiplies (12,500 sequence register taps and multiplies, 128*4=512 first-level taps and multiplies, and 8*2=16 second-level taps and multiplies). Each of these represents an appreciable hardware (and inherent speed) advantage over a conventional parallel correlator, which would entail either 100,000 multiplies (one on each of 100,000 serial taps), or a very large correlator to resolve the random code. The processing gain in going from an N=100,000 length code to one is 50 dB, and from going from an N=10,000 length code to one is 40 dB. This is a substantial processing gain that can be exploited within the parameters of the present invention to further reduce hardware required to implement a parallel correlator.

It is notable that the probability of correctly aligning any individual one of the serial registers on the appropriate sequence of $R_1$ bits is $$\frac{1}{2^{R_1}},$$

and the probability that any serial register will be off by only one bit is $$\frac{R}{2^{R_1}}.$$

For example, where the serial registers 42 are of length $R_1=8$ bits, each serial register has a 1/256 chance of being aligned with the proper bit sequence of the code at any given time instant, and has a 1/32 chance of being mis-aligned by exactly one bit. Where the serial registers 42 are of length $R_1=4$ bits, each serial register has a 1/16 chance of being aligned with the proper bit sequence of the code at any given time instant, and has a 3/8 chance of being mis-aligned by exactly one bit. [It is noted that the probability of all of serial registers being aligned simultaneously is much lower; the above is for any arbitrary serial register 42]. Allowing a controlled error in alignment of the bits within any serial register 42 effectively allows a tradeoff of processing power or energy in exchange for a lower hardware requirement to despread. For example, allowing an error of one bit in an eight bit serial register, so that at least seven bits are correctly aligned, results in a loss of approximately 1.15 dB. The resulting parallel correlator need then have only four first-level registers 52 instead of eight, because referencing Table 1, each of the bit sequences for $B_1$, $B_2$, $B_3$, and $B_5$ (and their inverted mates on the A column) differ by no more than one bit and may be accumulated in a single first-level register 52 rather than in two as described at FIG. 2A. Increasing sequence register length to $R_1=12$ and allowing one bit to be mis-aligned drops that cost to approximately 0.7 dB, yet allows a parallel correlator to be implemented with an even more reduced hardware commitment. Thus, the hardware advantage and the energy cost are both more advantageous with longer length serial registers 42. An example will better illustrate this alternative embodiment.

Figure 3:
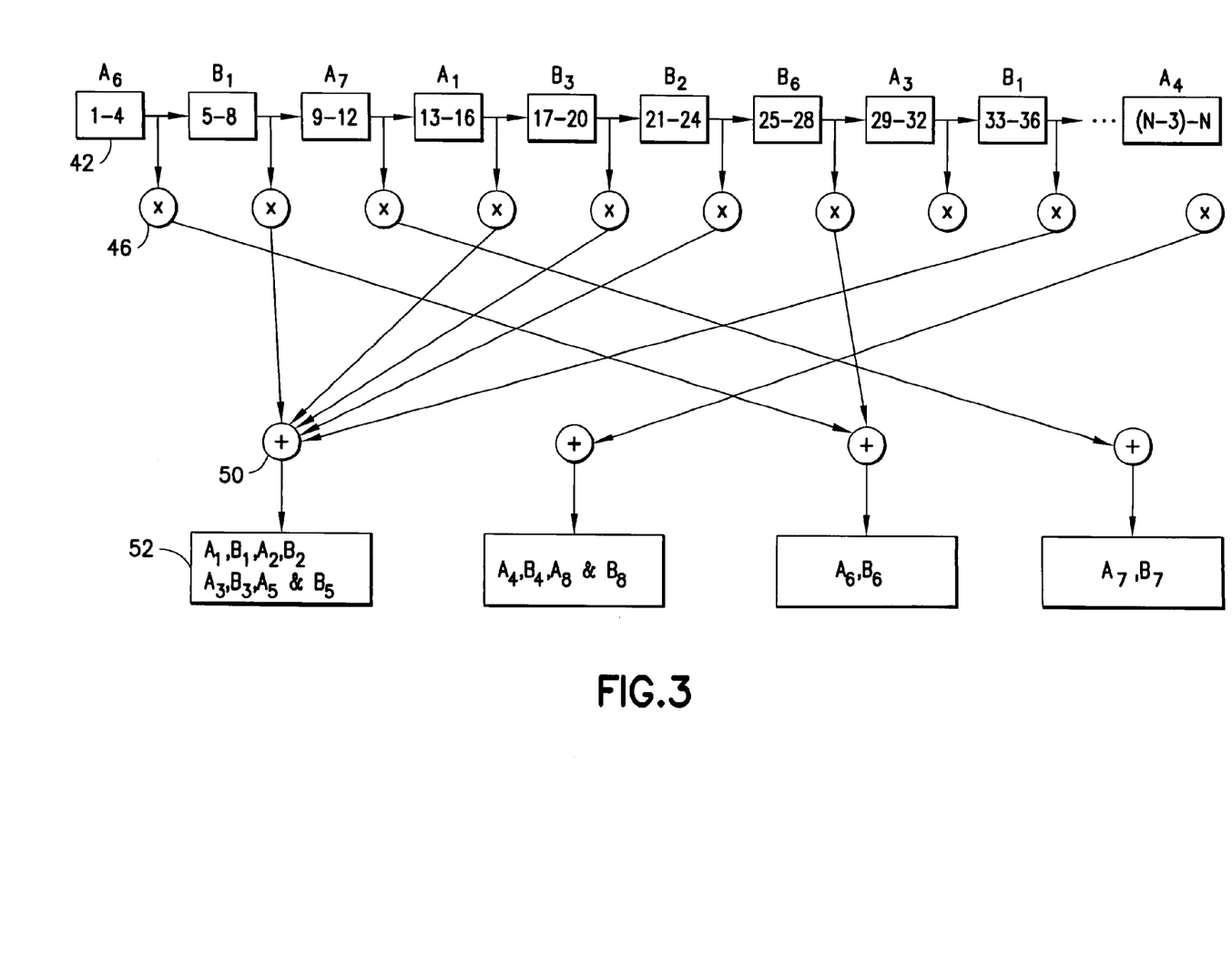
FIG. 3 is similar to FIG. 2A, but for an alternative embodiment of the present invention.

FIG. 3 is a first alternative embodiment of the present invention, and operates similar to the parallel correlator of FIG. 2A with the following distinguishing features. Each sequence register 42 carrying a bit-sequence (after multiplication by the appropriate +1 or −1) that differs from each other by no more than a single bit is input into a single first-level register 52. In the example above for FIGS. 2A-2B, with sequence registers 42 carrying four bits each, then of the sequences defined in Table 1, bit sequences corresponding to $A_1, B_1, A_2, B_2, A_3, B_3, A_5,$ and $B_5$ are each input into a single first-level register 52. Similarly, the remaining bit sequences are each input into one of three remaining first-level registers 52 ($A_4, B_4, A_8$ and $B_8$ in one register; $A_6$ combined with $B_6$ in another; and $A_7$ combined with $B_7$ in the last), and in this instance there are only four first-level registers 52, each carrying four bits. Where the true number of unique bit sequences in a series of $R_1$ bits is $2^{R_1}$, the number of first-level registers 52 is reduced from $2^{(R-1)}$ as in FIG. 2A (since inverted bit sequences are combined) to $2^{(R-2)}$ where bit sequences (and their inverse) are combined with other bit-sequences differing by no more than one bit. For the embodiment wherein another level of processing (not shown) sub-accumulates similar (or nearly similar) bits, the second and third levels may be as shown in FIG. 2B, or the four first-level registers 52 of FIG. 3 may each have four taps, one for each bit, feeding separate multipliers that are then accumulated at a single adder such as adder 64 of FIG. 2B that outputs to a PNCA accumulator 66. The energy cost is approximately 1.15 dB, so if additional energy can be expended at the transmitter to account for this loss, such an implementation is advantageous. As noted above, the hardware advantage is increased for larger size sequence registers 42, as more bit sequences may be combined that vary by only one bit or less. For larger sequence registers 42, the energy cost is also decreased as compared to shorter sequence registers 42.

It is noted that combining at an adder 50, 58 bit sequences that differ by one bit or less need not combine all possible one-bit differing sequences as in the above description of FIG. 3. Sequences that differ only in a particular bit position may also be combined, with a corresponding lower 'savings' in hardware implementation and decreased energy 'cost' as compared to allowing sub-sequence accumulation for sequences with bit differences at any position in the sequence. The end result is somewhere between the embodiments particularly described with reference to FIGS. 2A and 3.

The receiver of which the parallel correlator 40 is a part may be provided the appropriate multiplier factors (+1/−1) for the various multipliers 46 associated with the sequence registers 42 directly by the transmitter sending the message, such as in a training sequence in a packet header or body, or in a side channel, as known in the art for assisting a receiver in despreading a PN code. Any remaining multiply factors (+1/−1) at registers 52 of other levels may be computed within the receiver itself and need not be directly provided.

Figure 4:
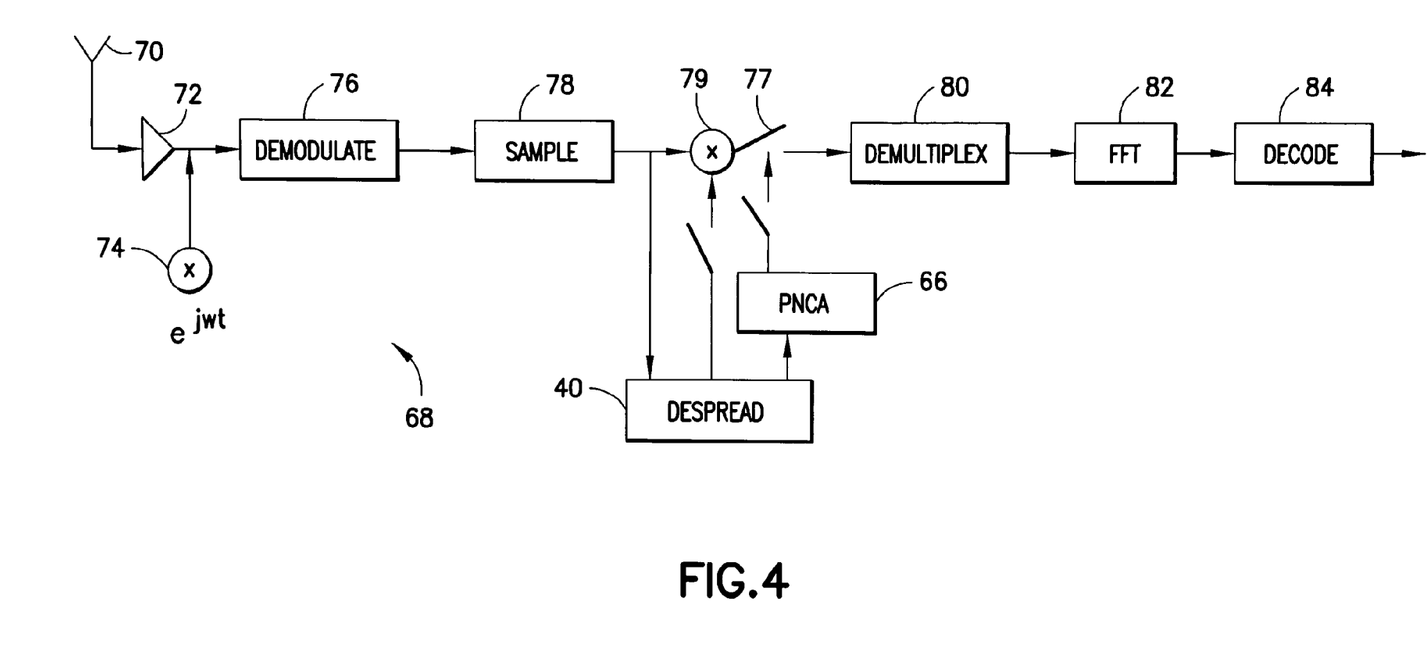
FIG. 4 is a block diagram of a receiver in which the parallel correlator of FIG. 2 or 3 may be disposed.

As is known in the art, continuous spread spectrum receivers continuously demodulate and despread received signals. Such receivers need to be synchronized with a transmitter or a received signal only once provided that the received signals remain relatively continuous. FIG. 4 is a receiver 68 in which the above-described parallel correlator 40 may be employed for de-spreading a series of received bursts that were transmitted over a spread spectrum channel or channels. A spread spectrum burst signal is received at one or more receive antennas 70 and amplified at a RF amplifier 72. A downconverter 74 converts the amplified RF signal to a more convenient frequency such as IF for further signal processing. For example, the input signal applied at the downconverter 74 may be at a carrier frequency of 900 MHz and the downconverter 74 may down convert the signal to a carrier frequency near DC so that digital signal processing techniques can be used. It is noteworthy that the downconverter 74 may not be necessary if the input signal is already at a carrier frequency that is suitable for further processing, and depending upon the particular arrangement of further processing blocks, downconversion may occur at another point in the receiver 68, either to IF or in some cases directly from RF to baseband. The downconverted signal is demodulated at a demodulator 76 and digitally sampled at a sampler 78, which outputs a baseband signal. Additional components such as a low pass filter, a decimation filter, and a channel estimator may be disposed between the receive antenna 70 and the digital sampler 78.

The sampled baseband signal from the sampler 78 is input into the parallel correlator 40 and processed as described above. When an energy peak is present in the PNCA accumulator 66, such as when the data bits in the series of sequence registers are identical to the spreading code or when one or more of the sequence registers exhibits only a single bit difference from other sequence registers, the PNCA accumulator closes a switch 77 that couples a multiplier 79 to downstream processing blocks 80, 82, 84. The multiplier 79 multiplies the output of the sampler 78 by the spreading code that is aligned in the sequence registers at the time the PNCA accumulator 66 exhibits an energy peak, thereby despreading the output of the sampler 78 by the aligned code. The despread baseband signal is then further processed as known in the art, such as by a demultiplexer 80, a fast Fourier transform FFT block 82, and a decoder 84. Decryption and verification (not shown) may also be performed downstream of the parallel correlator 40. The underlying substantive data of the received packets may be voice or data.

It will be evident to those skilled in the art that the demodulator 76 may have as an additional input a feedback from the parallel correlator, so that 'soft' outputs of the demodulator 76 may be modified downstream of that demodulator to correct what is determined by later processing to be an erroneous 'soft' decision. Also, the demodulator 76 and sampler 78 may be an integrated processing block performing demodulation and digital sampling simultaneously. The receiver 68 of FIG. 4 may be disposed on a fixed platform such as within a building or a radio tower, or is preferably disposed within a moveable platform such as the command node 24 or the hailing node 34 of FIG. 1.

It is noted that the drawings and description presented herein are illustrative of the invention and not exhaustive. While there has been illustrated and described what is at present considered to be preferred and alternative embodiments of the claimed invention, it will be appreciated that numerous changes and modifications are likely to occur to those skilled in the art. It is intended in the appended claims to cover all those changes and modifications that fall within the spirit and scope of the claimed invention.

What is claimed is:

1. A parallel correlator for determining a spreading code of length N comprising:
    a plurality of P sequence registers each of length $R_1$ in series with one another;
    at least two first-level multipliers, each coupled to an output of a sequence register, wherein a first portion of said at least two first level multipliers operates to output a value that is an inverse of its input and a second portion of said at least two first level multipliers operates to output a value that is not an inverse of its input; and
    at least one first-level accumulator comprising an adder having an output coupled to a first-level register, said adder having inputs coupled to outputs of at least one multiplier of each of the first and second portions, said first-level register to temporarily store an output of the adder of the first-level accumulator;
    wherein N, $R_1$ and P are integers.

2. The parallel correlator of claim 1 wherein $P*R_1=N$.

3. The parallel correlator of claim 1, wherein each of said first-level registers is of length $R_1$.

4. The parallel correlator of claim 1 wherein all of said at least two first level multipliers are in one of the first and second portion such that a total number of first-level multipliers equals P.

5. The parallel correlator of claim 1 further comprising a processor coupled to the first-level multipliers to assign each of said first-level multipliers to the first or second portion based on a message received from a transmitter using the spreading code of length N.

6. The parallel correlator of claim 1 wherein there are X first level accumulators, and $X=2^{(R_1-1)}$.

7. The parallel correlator of claim 1 wherein there are X first level accumulators, and $X \leq 2^{(R_1-1)}$.

8. The parallel correlator of claim 7 wherein there are X first level accumulators, and $X < 2^{(R_1-1)}$.

9. The parallel correlator of claim 1 wherein the output of the sequence register that is input into its respective first-level multipliers comprises a digital word of length $R_1$.

10. The parallel correlator of claim 1 further comprising:
at least two second-level multipliers, each coupled to an output of a first-level register of length $R_1$, wherein a first portion of said at least two second level multipliers operates to output a value that is an inverse of its input and a second portion of said at least two first level multipliers operates to output a value that is not an inverse of its input, and wherein the input to each of the second-level multipliers is a digital word of length $R_2$ that is an integer less than $R_1$; and
at least one second-level accumulator comprising an adder having an output coupled to a second-level register of length $R_2$, said adder having inputs coupled outputs of at least one second-level multiplier of each of the first and second portions, and said second-level register to temporarily store an output of the adder of the second-level accumulator.

11. The parallel correlator of claim 10 further comprising:
a third-level adder having an input coupled to outputs of each of said plurality of third-level registers; and
an accumulator having an input coupled to an output of said third-level adder for temporarily storing an output of said third-level adder.

12. The parallel correlator of claim 10 wherein the at least one second-level accumulator comprises Y second-level accumulators, Y and $R_2$ each being integers greater than one.

13. A method for despreading a spread spectrum input signal, comprising:
temporarily storing a received code of length N in a series of P sequence registers, each of length $R_1$, where $P*R_1=N$;
inverting a bit sequence stored in a subset of the sequence registers;
after the inverting, combining at least a first set of bit-sequences that are identical and storing the combined first set in a first sub-sequence accumulation register, and combining at least a second set of bit-sequences that are identical and storing the combined second set in a second sub-sequence accumulation register;
combining the bit-sequences stored in the first and second sub-accumulation registers in a total register;
sensing an energy peak in the total register; and
multiplying the spread spectrum input signal by the code of length N that is stored in the sequence registers.

14. The method of claim 13 wherein combining at least bit-sequences that are identical comprises combining only bit-sequences that are identical.

15. The method of claim 13 wherein combining at least bit-sequences that are identical comprises combining bit-sequences that are identical with bit-sequences that differ from every other bit-sequence by no more than a single bit.

16. The method of claim 13 wherein combining at least bit-sequences that are identical comprises combining bit-sequences that are identical with bit-sequences that differ from every other bit-sequence by more than a single bit.

17. The method of claim 13 wherein combining the bit-sequences stored in the first and second sub-accumulation registers in a total register further comprises:
inverting at least one of the bits in at least one of the first and second sub-accumulation registers; and
combining the bit-sequences stored in the first and second sub-accumulation registers into a single bit that is output to the total register.

18. A receiver comprising:
at least one receive antenna;
a digital sampler having an input coupled to the at least one receive antenna;
a multiplier having a first input coupled to an output of the digital sampler;
a switch for selectively providing a second input to the multiplier;
a PNCA accumulator for actuating the switch; and
a parallel correlator comprising:
a plurality of sequence registers each in series with one another;
a plurality of multipliers each coupled to an output of one of the sequence registers, a first portion of said multipliers for providing an inverted output and a second portion for providing a non-inverted output;
at least one correlator accumulator for combining at least all like non-inverted outputs of the multipliers with all like inverted outputs of the multipliers;
wherein the at least one correlator accumulator has an output coupled to an input of the PNCA accumulator and the series of sequence registers have an output coupled to the second input of the multiplier.

19. The receiver of claim 18 disposed on a mobile platform.

* * * * *